UNITED STATES PATENT OFFICE.

MARCEL DELAGE, OF PARIS, FRANCE.

SYSTEM OF HEATING BY MEANS OF RADIO-INCANDESCENT BODIES.

975,837. Specification of Letters Patent. Patented Nov. 15, 1910.

No Drawing. Application filed October 24, 1905. Serial No. 284,255.

*To all whom it may concern:*

Be it known that I, MARCEL DELAGE, engineer chemist, a citizen of the French Republic, residing at 27 Boulevard Pereire, Paris, France, have invented new and useful Improvements in Systems of Heating by Means of Radio-Incandescent Bodies; and I do hereby declare the following to be a full, clear, and exact description of the same.

My invention consists principally in a process of heating by radiation in which I utilize the great emissive power of the radiant heat of the oxid of cerium brought to incandescence, by means of a refractory body which serves as a support for a more or less thick layer of this oxid spread over the entire surface of the refractory body.

It consists further in the process of manufacturing the said refractory products adapted to be heated by means of a Bunsen or other similar flame, so as to serve for heating apartments or other spaces, the said heat being produced principally by radiation.

The refractory product manufactured according to my invention is of such a composition and structure that it differs from other bodies which have been used as incandescent bodies, in that it is not luminous and that it possesses the property of emitting much radiant heat.

The essential element of my product adapted for heating is the oxid of cerium, but instead of using it in very small quantities and spread uniformly throughout the entire mass, as it is already used in the treatment of mantles for lighting, I use it in an entirely different manner, as will be told hereafter, and in a way to disclose its radiant properties. For this purpose, I use it not only in much greater proportions, but, moreover, so that it may be contained not in the masses, but that it may cover the entire surface of the refractory body. In this manner I utilize the radiant properties for heat which the oxid of cerium possesses, properties which were not known up to the present time, and which appear only when the cerium is contained in large quantities in the refractory body, or when it covers the entire surface thereof. The other refractory substances employed serve only as support for the cerium.

In order to carry out my invention, I generally proceed by one of the two following methods which I have found to give good results in practice.

When the refractory products are to be handled frequently and should, consequently, not be fragile, I take as support solid and hollow cylinders, pierced with holes and closed at the top (that being a well known form) composed of porcelain or refractory clay. These cylinders are dipped after baking in a solution of a compound of cerium. The refractory dipped support is then dried and calcined, in order to provide a deposit of cerium oxid on the surface and in the pores thereof, or on the other hand, one can dip the cylinder in an emulsion of the oxid of cerium in water and then bake it. This operation can be renewed as many times as necessary, in order to give to the layer of oxid of cerium the desired thickness. I can then form the refractory support in the shape of disks, rings or all other bodies capable of being brought to incandescence.

When the refractory product does not require much handling and can, consequently, assume a more fragile shape, I make it in the shape of a reticulated support prepared in the same manner as that of the well-known "Welsbach" mantles, but in a stronger and more solid manner. Thus, for example, I make a reticulated support, such for example as a plate or cylinder, slotted or perforated; wire cloth; rods or the like, the material of which may comprise natural or artificial oxids, silicates and compounds which are fireproof at high temperatures, as for example compounds of aluminum, magnesium, thorium, cerium, beryllium, uranium or metals which are similar in chemical respects, or any suitable combination of the above such for example as magnesite, china-clay, sea-foam stone, etc. I plunge then the support, thus desirably shaped, into a concentrated solution of a compound of cerium in water, or even a suitably diluted paste thereof, and I calcine, in order to convert the compound into oxid. The immersions and calcinations may be repeated several times. One can also obtain refractory bodies suitable for heating, but giving results inferior to those given by the products manufactured as above, by mixing a large proportion, *circa* 50 per cent. of oxid cerium in the mass of the refractory body.

The distinctive feature of my invention is the large proportion of cerium employed and especially its diffusion over the whole surface of the refractory body. This feature completely distinguishes my heating refractory body from mantles of the Welsbach class employed for lighting. Because of the large percentage of cerium employed and especially because the surface of the refractory body is constituted by a layer of oxid of cerium, my refractory products for heating are entirely improper for lighting, even when they are as fine as the mantles employed for lighting. My refractory product is distinguished by the large proportion of heating rays that they emit, the bulk of the radiant energy emitted from the surface thereof having obviously a wave length greater than that of red light; this being due to the presence of the cerium and to its diffusion over the surface.

What I claim, is:—

As an article of manufacture, a refractory product for heating by radiation, comprising a support of refractory material the surface of which is covered with material having a content of oxid of cerium in such quantity that the amount of radiant energy emitted by said surface in the form of light is insufficient for lighting purposes, the bulk of said energy being emitted as radiant heat.

In testimony whereof, I have signed my name to this specification in the presence of two subscribing witnesses.

MARCEL DELAGE.

Witnesses:
  EDMOND CAILLE,
  CHARLES GOBE.